United States Patent

Kim

[11] Patent Number: 5,969,766
[45] Date of Patent: Oct. 19, 1999

[54] METHOD AND APPARATUS FOR CONTOUR MOTION ESTIMATING A BINARY IMAGE BY USING A WEIGHTED BLOCK MATCH ALGORITHM

[75] Inventor: Jin-Hun Kim, Seoul, Rep. of Korea

[73] Assignee: Daewoo Electronics Co., Ltd, Rep. of Korea

[21] Appl. No.: 08/918,040

[22] Filed: Aug. 25, 1997

[30] Foreign Application Priority Data

Jul. 19, 1997 [KR] Rep. of Korea ................. 97-33820

[51] Int. Cl.$^6$ ................................. H04N 7/32
[52] U.S. Cl. .................. 348/413; 348/416; 348/699; 382/236; 382/239
[58] Field of Search ................... 348/402, 405, 348/413, 416, 411, 699, 700, 407, 420; 382/236, 239; 358/105

[56] References Cited

U.S. PATENT DOCUMENTS

| | | | |
|---|---|---|---|
| 5,200,820 | 4/1993 | Gharavi | 358/105 |
| 5,561,475 | 10/1996 | Jung | 348/699 |
| 5,596,370 | 1/1997 | Jung | 348/416 |
| 5,689,312 | 11/1997 | Kim | 348/699 |
| 5,754,237 | 5/1998 | Jung | 348/413 |
| 5,760,845 | 6/1998 | Kim | 348/699 |
| 5,808,685 | 9/1998 | Jung | 348/416 |
| 5,838,391 | 11/1998 | Kim | 348/699 |

FOREIGN PATENT DOCUMENTS

| | | |
|---|---|---|
| 0720355 | 7/1996 | European Pat. Off. . |
| 0722252 | 7/1996 | European Pat. Off. . |

*Primary Examiner*—Richard Lee
*Assistant Examiner*—Tung T. Vo
*Attorney, Agent, or Firm*—Anderson Kill & Olick

[57] ABSTRACT

A motion estimating method, for use in a motion estimation between a current and a previous frames of a binary video image, wherein the current frame is divided into a plurality of equal sized search blocks, forms a search region corresponding to each search block within the previous frame and a plurality of candidate blocks within the search region, each of the candidate blocks having a same size as the search block, to thereby provide a displacement of each candidate block from the search block as a displacement vector of each candidate block. Thereafter, the method overlaps the search block with each candidate block to thereby determine an unmatched region, a boundary of a matched region and a boundary of the search block and assigns a weight to each of the pixels within the unmatched region on a predetermined basis, wherein the weight may vary from pixel to pixel. Then, the method calculates a weighted error of each candidate block by using the weights and selects a displacement vector which has a minimum error as an optimum motion vector.

10 Claims, 6 Drawing Sheets

CB₂

CB₁

SB

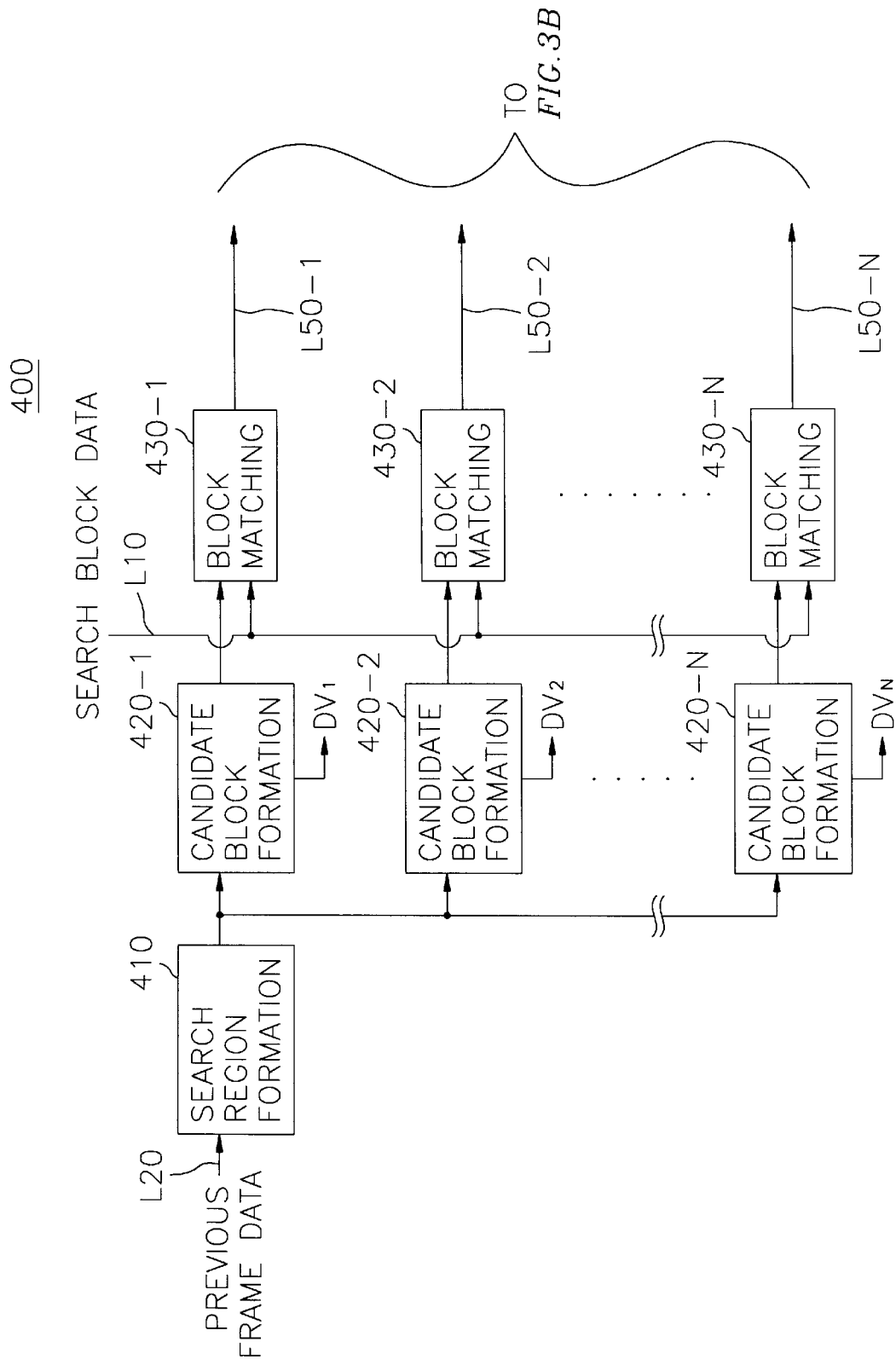

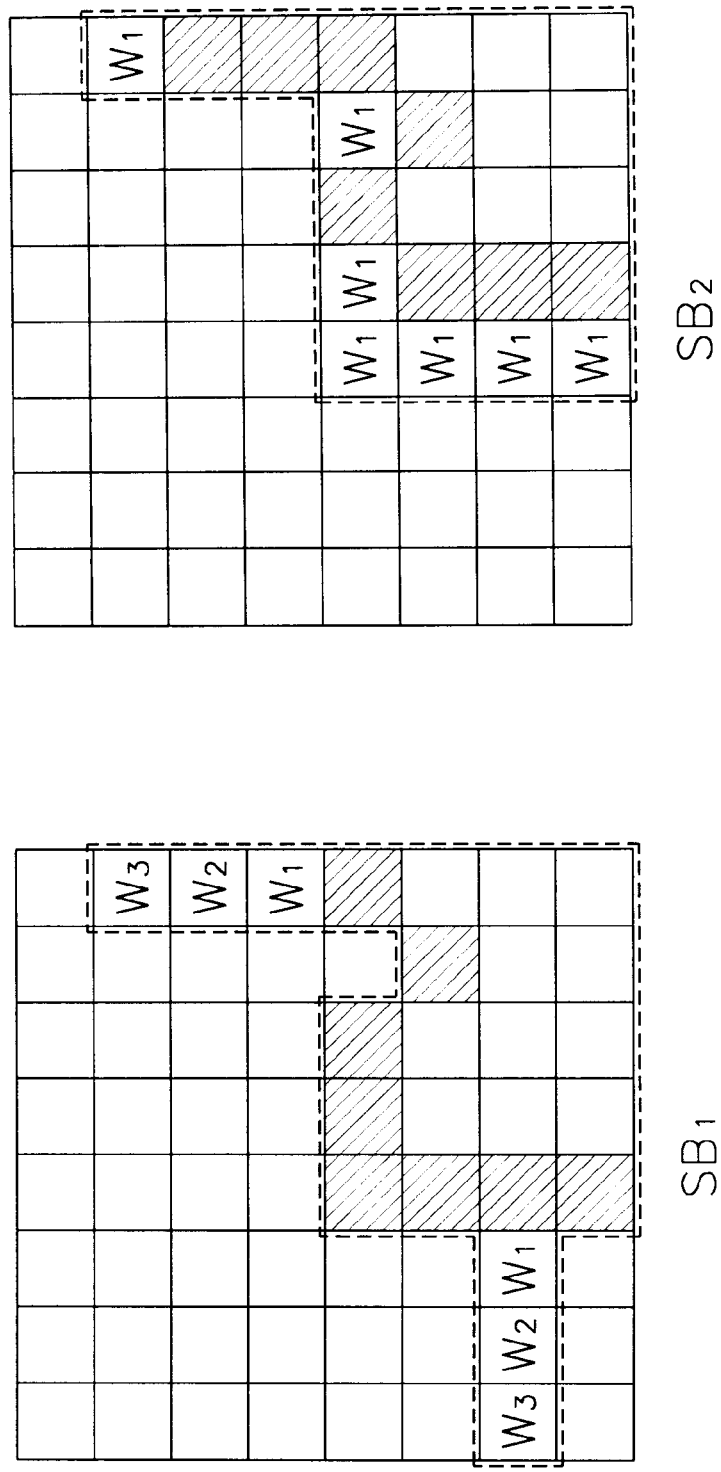

METHOD AND APPARATUS FOR CONTOUR MOTION ESTIMATING A BINARY IMAGE BY USING A WEIGHTED BLOCK MATCH ALGORITHM

FIELD OF THE INVENTION

The present invention relates to a method and apparatus for finding an optimum motion vector that yields a minimum weighted error by using a weighted block match algorithm; and, more particularly, to a method and apparatus for determining weighted errors by assigning a weight which varies from one pixel to another in a video frame.

DESCRIPTION OF THE PRIOR ART

Transmission of digitized video signals can deliver video images of a much higher quality than that of video images transmitted in analog signals. When an image signal comprising a sequence of image frames is expressed in a digital form, a substantial amount of data is generated, especially in the case of a high definition television system. Since, however, the available frequency bandwidth of a conventional transmission channel is limited, in order to transmit the substantial amount of digital data through the limited channel bandwidth, it is necessary to compress or reduce the volume of the transmission data. Among various video compressing techniques, the so-called hybrid coding technique, which combines temporal and spatial compression techniques together with a statistical coding technique, is known to be most effective.

Most hybrid coding techniques employ a motion compensated DPCM(differential pulse code modulation), two-dimensional DCT(discrete cosine transform), quantization of DCT coefficients, and VLC(variable length coding). The motion compensated DPCM is a process of determining the movement of an object between a current frame and its reference, e.g., a previous, frame, predicting the current frame according to the motion flow of the object and producing a differential signal representing the difference between the current frame and its prediction.

The two-dimensional DCT, which reduces or removes spatial redundancies between image data such as motion compensated DPCM data, converts a block of digital image data, for example, a block of 8×8 pixels, into a set of DCT coefficient data. This technique is described in Chen and Pratt, "Scene Adaptive Coder", IEEE Transctions on Communications, COM-32, NO.3, pp.225–231 (March 1984). By processing such DCT coefficient data with a quantizer, zigzag scanning, and VLC, the amount of data to be transmitted can be effectively compressed.

Specifically, in the motion compensated DPCM, current frame data is predicted from previous frame data based on the estimation of the motion between the current and the previous frames, e.g., through the use of a block matching algorithm (see, e.g., J. R. Jain et al., "Displacement Measurement and Its Application in Interframe Image Coding", IEEE Transactions of Communications, COM-29, NO.12, pp 1799–1808 (December 1981)). Such estimated motion may be described in terms of two dimensional motion vectors representing the displacements of pixels between the current and the previous frames.

According to the block matching algorithm, a current frame is divided into a plurality of search blocks. The size of a search block typically ranges between 8×8 and 32×32 pixels. To determine a motion vector for a search block in the current frame, a similarity calculation is performed between the search block of the current frame and each of a plurality of equal sized candidate blocks included in a generally larger search region within a previous frame. An error function such as the mean absolute error or mean square error is used to carry out a similarity measurement between the search block of the current frame and each of the candidate blocks in the search region. And a motion vector, by definition, represents a displacement between the search block and a candidate block which yields a minimum error function.

As is well known, each pixel in a binary image has a label identifying one of the regions it belongs to: for instance, a pixel in a background is labeled by "0"; and a pixel in an object is labeled by a non-zero value. Therefore, if the conventional block match algorithm which uses the mean absolute error as an error function is applied to a contour motion estimation of the binary image, the role of the error function is merely to count the number of unmatched pixels, wherein each unmatched pixel is a pixel in a candidate block whose corresponding pixel within a search block has a different label value therefrom.

Referring to FIG. 1, there are illustrated a search block SB, a first candidate block $CB_1$ and a second candidate block $CB_2$, with unmatched pixels marked by "o". As exemplified, when the search block SB is overlapped with the first candidate block $CB_1$, the number of the unmatched pixels is 6; and when the search block SB is overlapped with the second candidate block $CB_2$, the number of the unmatched pixels is 7. Then, the first candidate block $CB_1$ is selected as a block which yields a minimum error function and the displacement of the first candidate block $CB_1$ from the search block SB is selected as an optimum motion vector even though the second candidate block $CB_2$ bears more resemblance to the search block SB in shape than the first candidate block $CB_1$.

If a motion vector is selected in such a way, the contour information of real significance in determining the shape of an object may not be able to play its due role in determining the shape of the object.

SUMMARY OF THE INVENTION

It is, therefore, a primary object of the present invention to provide a method and apparatus for finding an optimum motion vector that yields a minimum weighted error by using a weighted block match algorithm.

In accordance with the present invention, there is provided a method for motion estimating between a current and a previous frames of a binary video image, wherein the current frame is divided into a plurality of equal-sized search blocks, the method comprising the steps of: (a) forming a multiplicity of search regions within the previous frame, wherein each search region corresponds to each search block; (b) forming a plurality of candidate blocks within the search region, each of the candidate blocks having a same size as the search block, to thereby provide a displacement of each candidate block from the search block as a displacement vector of each candidate block; (c) overlapping the search block with each candidate block to thereby determine an unmatched region, a boundary of a matched region and a boundary of the search block; (d) assigning a weight to each of the pixels within the unmatched region; (e) calculating a weighted error of each candidate block by using the weight assigned to each of the pixels within the unmatched region in step (d); (f) comparing the weighted errors with each other to thereby select a minimum weighted error, and providing a selection signal, wherein the selection signal indicates which displacement vector corresponds to the minimum weighted error; and (g) selecting the displacement vector corresponding to the minimum weighted error in response to the selection signal to thereby provide as an optimum motion vector.

BRIEF DESCRIPTION OF THE DRAWINGS

The above and other objects and features of the present invention will become apparent from the following description of preferred embodiments given in conjunction with the accompanying drawings, in which:

FIGS. 3A and 3B illustrate a detailed diagram of the motion estimation unit shown in FIG. 2;

FIG. 4A demonstrates a method for assigning weights based on boundary pixels of a matched region in accordance with a first embodiment of the present invention.

DETAILED DESCRIPTION OF THE PREFERRED EMBODIMENTS

Figure 2:
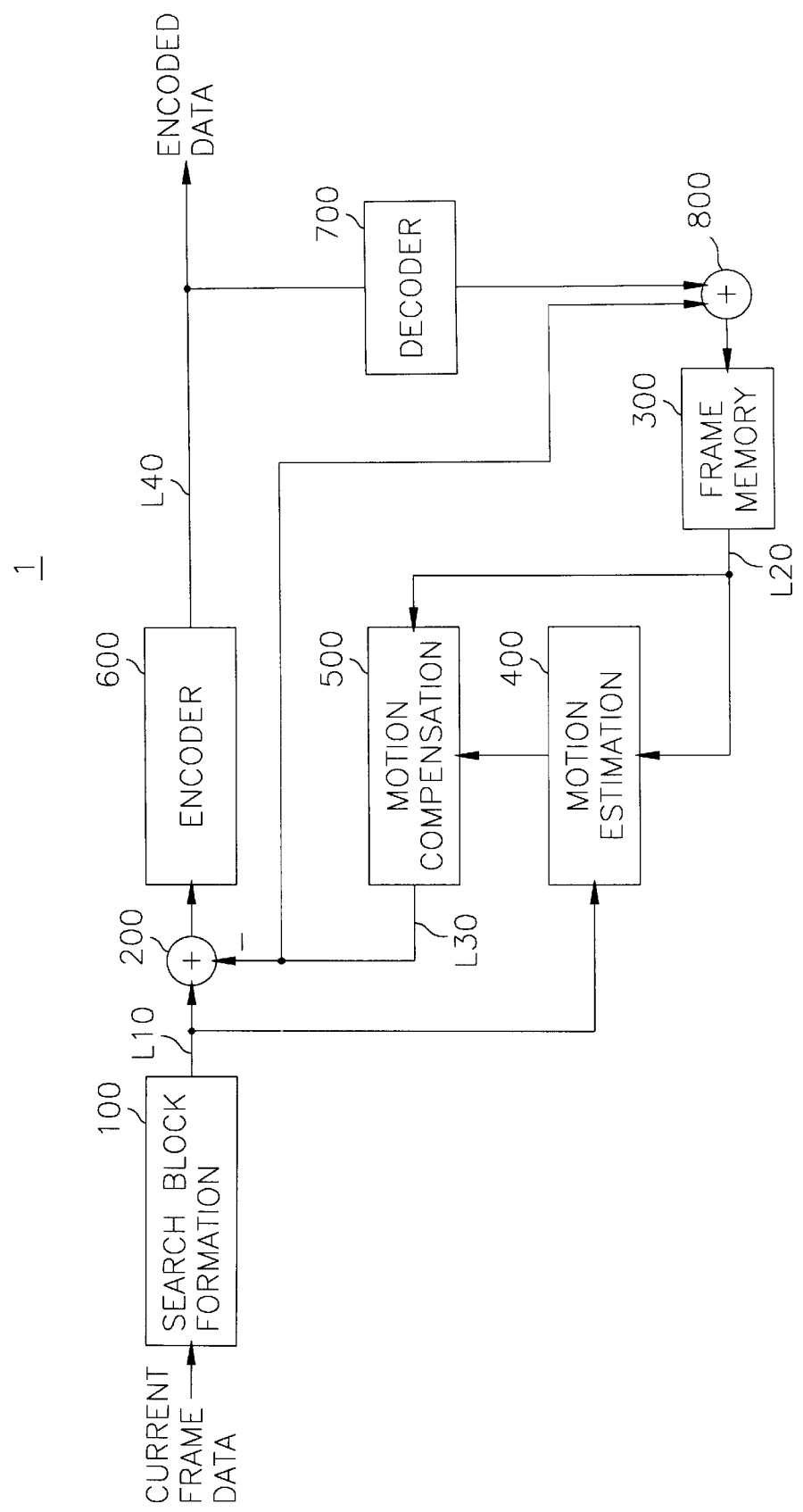
FIG. 2 represents a block diagram of a contour encoding apparatus containing a motion estimation unit in accordance with the present invention.

Referring to FIG. 2, there is illustrated a block diagram of a contour encoding apparatus 1 containing a motion estimation unit in accordance with the present invention.

Binary image data of a current frame, namely a current frame data, is provided to a search block formation unit 100 in the form of a segmentation mask, wherein each pixel in the segmentation mask has a label identifying the region it belongs to. For instance, a pixel in a background is labeled by "0" and each pixel in an object is labeled by a non-zero value. The search block formation unit 100 divides the current frame into a plurality of equal-sized search blocks to thereby provide search block data to a substraction unit 200 and a motion estimation unit 400 via a line L10.

The motion estimation unit 400 is provided with binary image data of a previous frame, namely a previous frame data, from a frame memory 300 via a line L20 also in the form of a segmentation mask. Thereafter, the motion estimation unit 400 forms a search region corresponding to the search block to thereby divide it into a plurality of candidate blocks of an equal size as the search block. The motion estimation unit 400 is provided with search block data from the search block formation unit 100 via the line L10 to thereby calculate a weighted error between the search block and each candidate block by using a weighted block match algorithm and determine an optimum candidate block and an optimum motion vector corresponding thereto. A motion estimation technique using the weighted block match algorithm is further described in detail with reference to FIGS. 3 and 4. The optimum motion vector is provided to a motion compensation unit 500.

The motion compensation unit 500 is provided with the optimum motion vector from the motion estimation unit 400 and pixel data of the optimum candidate block corresponding to the optimum motion vector from the frame memory 300 via the line L20. Thereafter, the motion compensation unit 500 motion-compensates the optimum candidate block by using the optimum motion vector to thereby generate a motion compensated optimum candidate block and provide the motion compensated optimum candidate block to the substraction unit 200 and an addition unit 800 via a line L30.

The subtraction unit 200 subtracts the motion compensated optimum candidate block on the line L10 from the search block on the line L30 to thereby provide a substraction result, namely, an error signal, to an encoder 600.

The encoder 600 encodes the error signal by using, for example, a reference contour based encoding technique to thereby provide the encoded error signal to a transmitter (not shown) and a decoder 700.

The decoder 700 decodes the encoded error signal and sends the decoded error signal to the addition unit 800. The addition unit 800 adds the decoded error signal to the motion compensated optimum candidate block on the line L30 to thereby generate a reconstructed signal of the current frame. The reconstructed signal of the current frame is stored at the frame memory 300.

Figure 3B:
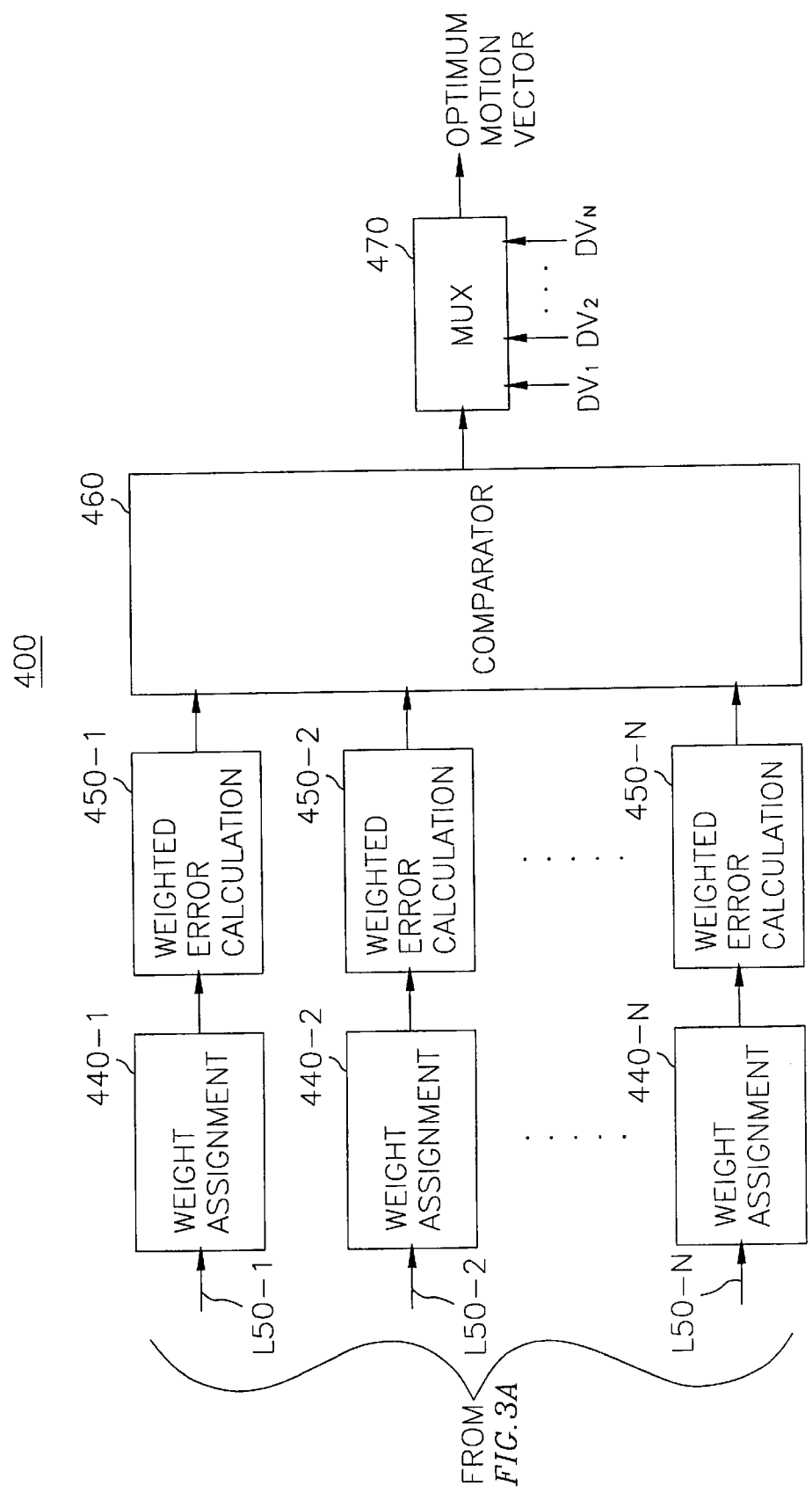

Referring to FIGS. 3A and 3B, there is illustrated a detailed block diagram of the motion estimation unit 400 shown in FIG. 2.

The previous frame data is provided to a search region formation unit 410 from the frame memory 300 via the line L20. The search region formation unit 410 defines a search region corresponding to the search block with a certain size, shape and search pattern, whereby the motion estimation of the search block is carried out. After the search region is determined at the search region formation unit 410, the search region data is applied to candidate block formation units 420-1 to 420-N, N being a positive integer representing the total number of the candidate blocks formed.

There may be a multiple number of candidate block formation units; however, only 3 units are depicted for the sake of simplicity. At each of the candidate block formation units 420-1 to 420-N, a candidate block of an identical size to that of the search block is generated within the search region; and pixel data of each candidate block is outputted therefrom to each of block matching units 430-1 to 430-N. The relative displacements of the candidate blocks from the location of the search block of the current frame are also outputted from the candidate block formation units 420-1 to 420-N to a multiplexer(MUX) 470 as displacement vectors $DV_1$ to $DV_N$.

As described above, the search block data on the line L10 from the search block formation unit 100 is also provided to the block matching units 430-1 to 430-N. At each of the block matching units 430-1 to 430-N, the pixel values of the search block and those of the corresponding candidate block are compared with each other. Specifically, each of the block matching units 430-1 to 430-N overlaps the search block with a corresponding candidate block therein; and marks boundary pixels of the search block, pixels of an unmatched region, and boundary pixels of a matched region on the search block data.

Since the search block data and the candidate block data are in the form of a segmentation mask, the pixel value is "0" if the pixel belongs to the background; and the pixel value is, for example, 1 if the pixel belongs to an object. The boundary pixel of the search block is a pixel within the search block, which has a pixel value "1" and an adjacent pixel thereto has a pixel value "0"; the pixel of the unmatched region is a pixel within the search block whose corresponding pixel within the corresponding candidate block has a different pixel value therefrom; and the boundary pixel of the matched region is a pixel within the search block which is adjacent to a pixel of the unmatched region or adjacent to a pixel having a pixel value of "0" when its pixel value is 1

The search block data marked at the boundary pixels of the search block, pixels within the unmatched region, and at the boundary pixels of the matched region are provided to weight assignment units 440-1 to 440-N via lines L50-1 to L50-N, respectively.

In accordance with a first embodiment of the present invention, each of the weight assignment units 440-1 to 440-N assigns a weight to each of unmatched pixel within a corresponding candidate block, wherein the unmatched pixels are pixels within the unmatched region and the weight varies from one unmatched pixel to another depending on its proximity to the boundary pixels of the matched region. The unmatched pixels located closer to the boundary pixels of the matched region are weighted less than those farther away from the boundary pixels of the matched region. That is, an unmatched pixel located near the boundary pixels of the matched region is assigned with a smaller weight than an unmatched pixel located farther away from the boundary pixels of the matched region.

Figure 1:
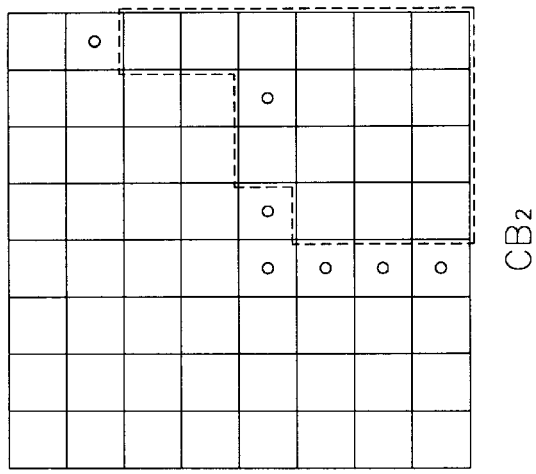
FIG. 1 shows a method for determining an error function between a search block and a candidate block by a conventional block match algorithm.
Figure 1:
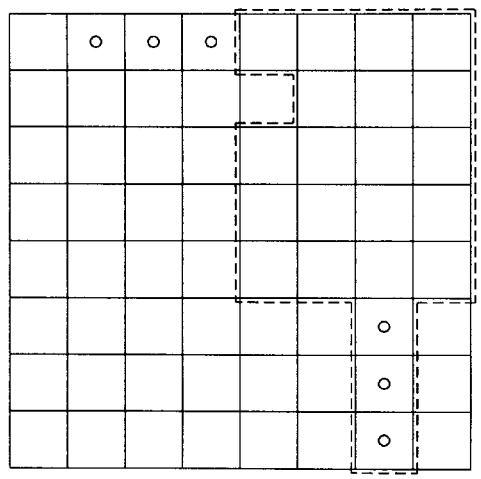
Figure 1:
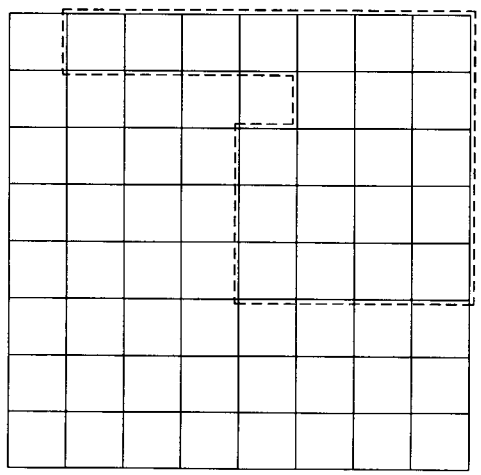

Referring to FIG. 4A, there is shown an exemplary diagram in accordance with the first embodiment of the present invention. $SB_i$, i being 1 or 2, indicates search block data marking at boundary pixels of a matched region and coloring at an unmatched region as a result of comparing the search block SB shown in FIG. 1 with an (i)th candidate block $CB_i$ shown in FIG. 1. Black colored pixels are the boundary pixels of the matched region; each of the unmatched pixels adjacent to the boundary pixels of the matched region is assigned with $w_1$; each of the unmatched pixels removed from the boundary pixels of the matched region by one pixel is assigned with $w_2$; and pixels removed from the boundary pixels of the matched region by two pixels are assigned with $w_3$, wherein $w_1$ is a positive value, $w_2$ is larger than $w_1$, and $w_3$ is larger than $w_2$.

In accordance with a second embodiment of the present invention, on the other hand, each of the weight assignment units 440-1 to 440-N assigns a weight to each of the unmatched pixels within a corresponding candidate block, wherein the weight varies from one unmatched pixel to another depending on its proximity to the boundary pixels of the search block. Unmatched pixels located closer to the boundary pixels of the search block are assigned with smaller weights than those farther away from the boundary pixels of the search block. That is, an unmatched pixel located at a same position of a boundary pixel of the search block is assigned with a smallest weight; and an unmatched pixel located farther from the boundary pixels of the search block is assigned with a larger weight.

Figure 4B:
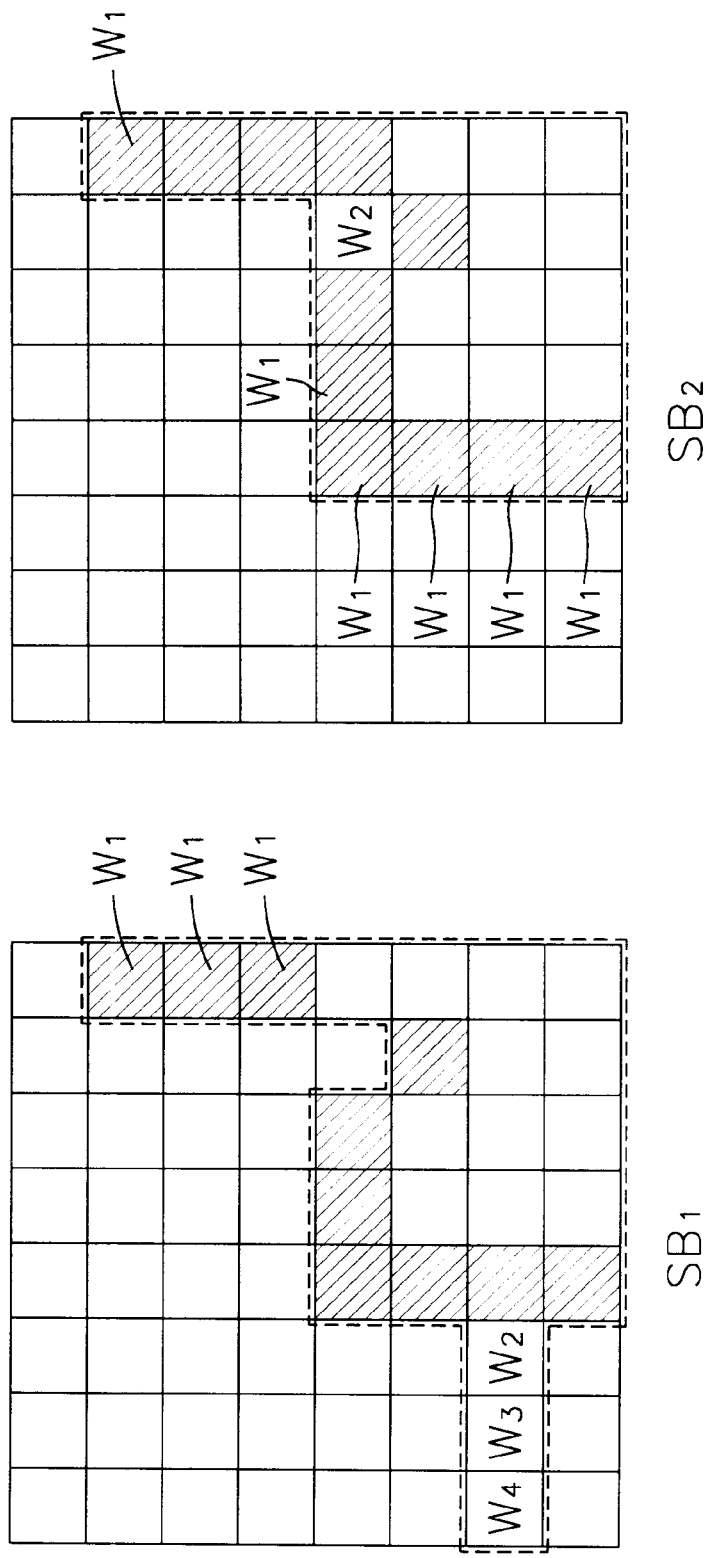
FIG. 4B describes a method for assigning wights based on boundary pixels of a search block in accordance with a second embodiment of the present invention.

Referring to FIG. 4B, there is shown an exemplary diagram in accordance with the second embodiment of the present invention. $SB_i$, i being 1 or 2, also indicates search block data marking at boundary pixels of a matched region and coloring at an unmatched region as a result of comparing the search block SB shown in FIG. 1 with an (i)th candidate block shown in FIG. 1. Black colored pixels are the boundary pixels of the search block; each of the unmatched pixels located at a same position of a boundary pixel of the matched region is assigned with $w_1$; each of the unmatched pixels adjacent to the pixels of the matched region is assigned with $w_2$; and each of the unmatched pixels removed from the pixels of the matched region by one pixel is assigned with $w_3$; and each of the unmatched pixels removed from the pixels of the matched region by two pixels is assigned with $w_4$, wherein $w_1$ is a positive value, $w_2$ is larger than $w_1$, $w_3$ is larger than $w_2$, and $w_4$ is larger than $w_3$.

The search block data whose unmatched pixels are weighted is provided to weighted error calculation units 450-1 to 450-N. Each of the weighted error calculation units 450-1 to 450-N calculates a weighted error for the corresponding candidate block. Specifically, at each of the weighted error calculation units 450-1 to 450-N, all the weight values assigned to the unmatched pixels in the corresponding candidate block are summed up to generate the weighted error. The calculated weighted errors for the corresponding candidate block are provided to a comparator 460.

Referring back to FIG. 4A, it will now be described how a weighted error can be calculated in accordance with the first embodiment of the present invention. Assuming that $w_1$ is 1, $w_2$ is 2, and $w_3$ is 3, the number of the unmatched pixels of $SB_1$ becomes 6, and the calculated weighted error $WE_1(SB_1)$ becomes 12 as follows:

$$WE_1(SB_1)=w_3+w_2+w_1+w_1+w_2+w_3$$

$$=2(w_1+w_2+w_3)=12.$$

Further, the number of the unmatched pixels of $SB_2$ becomes 7, and the calculated weighted error $WE_1(SB_2)$ becomes 7 as follows:

$$WE_1(SB_2)=w_1+w_1+w_1+w_1+w_1+w_1+w_1$$

$$=7w_1=7.$$

With reference to FIG. 4B, it can be illustrated how a weighted error can be calculated in accordance with the second embodiment of the present invention. Assuming that $w_1$ is 1, $w_2$ is 2, $w_3$ is 3, and $w_4$ is 4, the number of the unmatched pixels of $SB_1$ becomes 6, and the calculated weighted error $WE_2(SB_1)$ becomes 12 as follows:

$$WE_2(SB_1)=w_2+w_3+w_4+w_1+w_1+w_1$$

$$=3w_1+w_2+w_3+w_4=12$$

Further, the number of the unmatched pixels of $SB_2$ becomes 7, and the calculated weighted error $WE_2(SB_2)$ becomes 8 as follows:

$$WE_2(SB_2)=w_1+w_1+w_1+w_1+w_1+w_2+w_1$$

$$=6w_1+w_2=8.$$

By calculating the weighted error in accordance with the first and second embodiments of the present invention, the second candidate block $CB_2$ corresponding to $SB_2$ has a minimum weighted error.

Meanwhile, the comparator 460 compares the weighted errors with each other to thereby select a minimum weighted error; and provides a selection signal which enables the multiplexer 470 to select a displacement vector corresponding to the minimum weighted error.

The multiplexer 470 is provided with the displacement vectors $DV_1$ to $DV_N$ from the candidate block formation units 420-1 to 420-N, and selects the displacement vector corresponding to the minimum weighted error as an optimum motion vector in response to the selection signal from the comparator 460. The optimum motion vector is provided to the motion compensation unit 500 shown in FIG. 2.

As demonstrated above, by using the weighted block match algorithm, a contour motion is more effectively estimated in accordance with the present invention.

While the present invention has been described with respect to the particular embodiments, it will be apparent to those skilled in the art that various changes and modifications may be made without departing from the spirit and scope of the invention as defined in the following claims.

What is claimed is:

1. A method for motion estimating between a current and a previous frames of a binary image signal, wherein the current frame is divided into a plurality of equal sized search blocks, the method comprising the steps of:

(a) forming a multiplicity of search regions within the previous frame, wherein each search region corresponds to each search block;

(b) forming a plurality of candidate blocks within each search region, each of the candidate blocks having a same size as the search block, to thereby provide a displacement of each candidate block from the search block as a displacement vector of said each candidate block;

(c) overlapping the search block with each candidate block to thereby determine an unmatched region, a boundary of a matched region and a boundary of the search block;

(d) assigning a weight to each of the pixels within the unmatched region;

(e) calculating a weighted error of each candidate block by using the weights assigned to the pixels within the unmatched region in step (d);

(f) comparing the weighted errors with each other to thereby select a minimum weighted error, and providing a selection signal, wherein the selection signal indicates which displacement vector corresponds to the minimum weighted error; and (g) selecting the displacement vector corresponding to the minimum weighted error in response to the selection signal and providing it as an optimum motion vector.

2. The method according to claim 1, wherein said step (c) includes the steps of:

(c1) overlapping the search block with each of the candidate blocks;

(c2) comparing each pixel value of the search block with a corresponding pixel value of the candidate block, wherein the corresponding pixel value of the candidate block is a value of a pixel located at a same position of a pixel in the search block which is being compared with; and (c3) determining the unmatched region, the boundary of the matched region, and the boundary of the search block, wherein the unmatched region within the search block is comprised of pixels whose corresponding pixels within the corresponding candidate block have different pixel values therefrom, the boundary of the matched region within the search block is comprised of pixels whose pixel values are 1 and adjacent to the unmatched region or adjacent to pixels whose pixel values are 0, and the boundary of the search block is comprised of pixels whose pixel values are 1 and adjacent to pixels whose pixel values are 0.

3. The method according to claim 2, wherein said step (e) calculates the weighted error by summing up all of the weights assigned to the pixels within the unmatched region.

4. The method according to claim 3, wherein said step (d) assigns a weight to each pixel within the unmatched region on the basis of its proximity to the boundary of the matched region so that, a smaller weight is assigned to a pixel closer to the boundary of the matched region, and a larger weight is assigned to a pixel located farther from the boundary of the matched region.

5. The method according to claim 3, wherein said step (d) assigns a weight to each pixel within the unmatched region on the basis of its proximity to the boundary of the search block so that a smaller weight is assigned to a pixel located at the boundary of the search block, and a larger weight to a pixel apart located from the boundary of the search block.

6. An apparatus for motion estimating between a current and a previous frames of a binary image signal, wherein the current frame is divided into a plurality of equal sized search blocks, the method comprising:

a search region formation means for forming a multiplicity of search regions within the previous frame, wherein each search region corresponds to each search block;

a candidate block formation means for forming a plurality of candidate blocks within each search region, each of the candidate blocks having a same size as the search block, to thereby provide a displacement of each candidate block from the search block as a displacement vector of said each candidate block;

a block matching means for overlapping the search block with each candidate block to thereby determine an unmatched region, a boundary of a matched region and a boundary of the search block;

a weight assignment means for assigning a weight to each of the pixels within the unmatched region;

a weighted error calculating means for calculating a weighted error of each candidate block by using the weights assigned to the pixels within the unmatched region at the weight assignment means;

a comparing means for comparing the weighted errors with each other to thereby select a minimum weighted error, and providing a selection signal, wherein the selection signal indicates which displacement vector corresponds to the minimum weighted error; and a multiplexing means for selecting the displacement vector corresponding to the minimum weighted error in response to the selection signal and providing it as an optimum motion vector.

7. The apparatus according to claim 6, wherein said block matching means includes:

an overlapping means for overlapping the search block with each of the candidate blocks;

a matching means for comparing each pixel value of the search block with a corresponding pixel value of the candidate block, wherein the corresponding pixel value of the candidate block is a value of a pixel located at a same position of a pixel in the search block which is being compared with; and a determining means for determining the unmatched region, the boundary of the matched region, and the boundary of the search block, wherein the unmatched region within the search block is comprised of pixels whose corresponding pixels within the corresponding candidate block have different pixel values therefrom, the boundary of the matched region within the search block is comprised of pixels whose pixel values are 1 and adjacent to the unmatched region or adjacent to pixels whose pixel values are 0, and the boundary of the search block is comprised of pixels whose pixel values are 1 and adjacent to pixels whose pixel values are 0.

8. The apparatus according to claim 7, wherein said weighted error calculating means calculates the weighted error by summing up all of the weights assigned to the pixels within the unmatched region.

9. The apparatus according to claim 8, wherein said weight assignment means assigns a weight to each pixel within the unmatched region on the basis of its proximity to the boundary of the matched region so that, a smaller weight is assigned to a pixel closer to the boundary of the matched region, and a larger weight is assigned to a pixel located farther from the boundary of the matched region.

10. The apparatus according to claim 8, wherein said weight assignment means assigns a weight to each pixel within the unmatched region on the basis of its proximity to the boundary of the search block so that a smaller weight is assigned to a pixel located at the boundary of the search block, and a larger weight to a pixel apart located from the boundary of the search block.

* * * * *